(12) United States Patent
Jin

(10) Patent No.: US 10,887,171 B2
(45) Date of Patent: Jan. 5, 2021

(54) ROUTING CONFIGURATION METHOD OF VIEW FILES, STORAGE MEDIUM, TERMINAL DEVICE AND APPARATUS

(71) Applicant: PING AN TECHNOLOGY (SHENZHEN) CO., LTD., Guangdong (CN)

(72) Inventor: Mengjie Jin, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 358 days.

(21) Appl. No.: 16/088,061

(22) PCT Filed: Feb. 13, 2018

(86) PCT No.: PCT/CN2018/076661
§ 371 (c)(1),
(2) Date: Sep. 24, 2018

(87) PCT Pub. No.: WO2018/149395
PCT Pub. Date: Aug. 23, 2018

(65) Prior Publication Data
US 2020/0304366 A1 Sep. 24, 2020

(30) Foreign Application Priority Data
Feb. 16, 2017 (CN) .......................... 2017 1 0083295

(51) Int. Cl.
G06F 15/173 (2006.01)
H04L 12/24 (2006.01)
H04L 29/08 (2006.01)

(52) U.S. Cl.
CPC ............ H04L 41/082 (2013.01); H04L 67/02 (2013.01)

(58) Field of Classification Search
CPC .............................. H04L 41/082; H04L 67/02
See application file for complete search history.

(56) References Cited

U.S. PATENT DOCUMENTS

| | | | |
|---|---|---|---|
| 9,875,269 B1 * | 1/2018 | Doak | G06F 16/2343 |
| 2015/0007278 A1 * | 1/2015 | Benezra | G06F 21/31 |
| | | | 726/5 |

(Continued)

FOREIGN PATENT DOCUMENTS

| | | |
|---|---|---|
| CN | 104283920 A | 1/2015 |
| CN | 105630522 A | 6/2016 |
| CN | 106126249 A | 11/2016 |

*Primary Examiner* — Philip B Tran
(74) *Attorney, Agent, or Firm* — Loza & Loza, LLP; Michael F. Fedrick

(57) ABSTRACT

The present application discloses a routing configuration method of view files, a computer readable storage medium, a terminal device and an apparatus, which aims at solving a problem that an efficiency of manually configuring routing information of view file is low and routing configuration errors are prone to occur. The routing configuration method comprises: determining a target single page application; detecting whether there exists an update in a view file of the target single page application; determining an updated target view file if there is the update for the view file of the target single page application; acquiring update state information of the target view file; and updating routing configuration information in a routing configuration file of the target single page application according to the update state information.

15 Claims, 3 Drawing Sheets

(56) References Cited

U.S. PATENT DOCUMENTS

| | | | | |
|---|---|---|---|---|
| 2015/0052498 A1* | 2/2015 | Chauhan | ................... | G06F 8/38 |
| | | | | 717/109 |
| 2015/0278171 A1 | 10/2015 | Lefebvre et al. | | |
| 2016/0100030 A1* | 4/2016 | Brown | ................... | H04L 67/02 |
| | | | | 715/738 |
| 2017/0237635 A1* | 8/2017 | Veeravalli | ............ | G06T 11/206 |
| | | | | 709/224 |
| 2017/0237799 A1* | 8/2017 | Veeravalli | ............ | H04L 67/025 |
| | | | | 709/224 |

* cited by examiner

ROUTING CONFIGURATION METHOD OF VIEW FILES, STORAGE MEDIUM, TERMINAL DEVICE AND APPARATUS

CROSS-REFERENCE TO RELATED APPLICATIONS

The present application is the U.S. national stage of International Patent Application No. PCT/CN2018/076661, filed on Feb. 13, 2018 and entitled ROUTING CONFIGURATION METHOD OF VIEW FILES, STORAGE MEDIUM, TERMINAL DEVICE AND APPARATUS, which claims the benefit of priority under 35 U.S.C. § 119 from Chinese Patent Application No. 201710083295.7 filed on Feb. 16, 2017 and having the title "Routing configuration method of view files, storage medium, terminal device and apparatus." The disclosures of the foregoing applications are hereby incorporated by reference into the present application in their entirety.

TECHNICAL FIELD

The present application pertains to the technical field of single page applications, and particularly to a routing configuration method of view files, a storage medium, a terminal device and an apparatus.

BACKGROUND

A single page application, that is, SPA (Single Page Web Application), is an application having only one web page, and is a web application program used for loading a single HTML (Hypertext Markup Language) page and dynamically updating the page when the user interacts with an application program. Regarding the single page application, abundant views with strong interactivity are the key of whether a user can be attracted by the whole single page application or not. Therefore, when the single page application is created, a large number of view files need to be created so as to enhance a usage experience of the user.

At present, when a view file is created for a single page application, manual configuration of routing information needs to be performed for each view file respectively. However, due to the fact that a single page application usually requires a large number of view files, there is a high update frequency of these view files, and a working personnel needs to repeatedly write routing information codes for these updated view files so as to achieve routing configurations of the view files, the efficiency is low, and a problem of routing configuration errors are prone to occur, and a development and maintenance cost of the single page applications is increased.

SUMMARY

In a first aspect, embodiments of the present application provide a routing configuration method of view files comprising:
  determining a target single page application;
  detecting whether there exists an update in a view file of the target single page application;
  determining an updated target view file if there is the update for the view file of the target single page application;
  acquiring update state information of the target view file; and
  updating routing configuration information in a routing configuration file of the target single page application according to the update state information.

In a second aspect, the embodiments of the present application provide a computer readable storage medium which stores a computer readable instruction, when executing the computer readable instruction, the processor implements following steps of:
  determining a target single page application;
  detecting whether there exists an update in a view file of the target single page application;
  determining an updated target view file if there is the update for the view file of the target single page application;
  acquiring update state information of the target view file; and
  updating routing configuration information in a routing configuration file of the target single page application according to the update state information.

In a third aspect, the embodiments of the present application provide a terminal device which comprises a memory, a processor and a computer readable instruction stored in the memory and executable by the processor, when executing the computer readable instruction, the processor implements following steps of:
  determining a target single page application;
  detecting whether there exists an update in a view file of the target single page application;
  determining an updated target view file if there is the update for the view file of the target single page application;
  acquiring update state information of the target view file; and
  updating routing configuration information in a routing configuration file of the target single page application according to the update state information.

In a fourth aspect, the embodiments of the present application provide a routing configuration apparatus of view files comprising:
  an application determining module configured to determine a target single page application;
  an update detecting module configured to detect whether there exists an update in a view file of the target single page application;
  a view file determining module configured to determine an updated target view file if the update detecting module detects that there exists the update for the view file of the target single page application;
  a state information acquiring module configured to acquire update state information of the target view file; and
  a configuration information updating module configured to update routing configuration information in a routing configuration file of the target single page application according to the update state information.

In the present application, firstly, the target single page application is determined; secondly, whether there exists an update in the view file of the target single page application is detected; if there exists the update in the view file of the target single page application, the updated target single page application is determined; then, the update state information of the target view file is obtained; finally, the routing configuration information in the routing configuration file of the target single page application is updated according to the update state information. In the present application, by automatically detecting whether the view file of the single page application is updated, and updating the routing configuration information in the routing configuration file according to the update state information when there exists the update, automatic configuration of the view file routing information is achieved, and an update efficiency of the routing configuration information is improved, a probability of routing configuration errors is reduced, and development and maintenance cost of single page applications is reduced.

EMBODIMENTS OF THE PRESENT APPLICATION

The present application provides a method and device for routing configuration of view files, and is used for solving a problem that an efficiency of manually configuring routing information of view file is low, and routing configuration errors are prone to occur.

Figure 1:
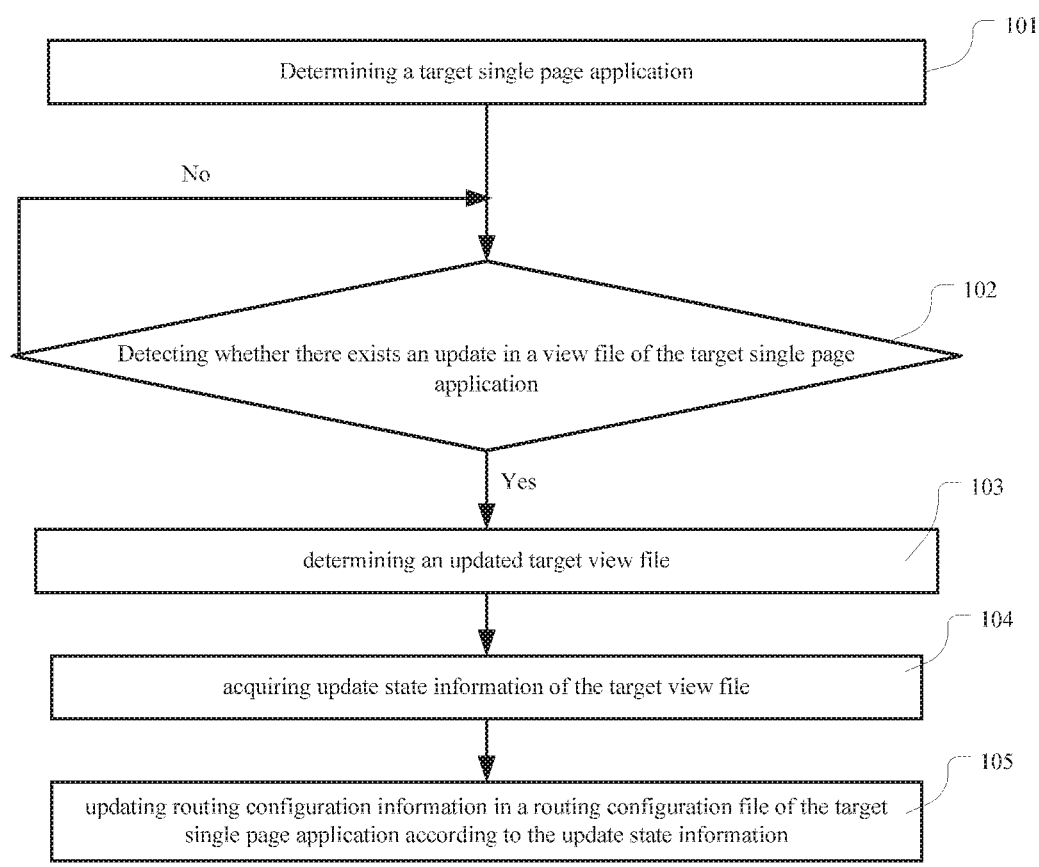
FIG. 1 illustrates a flow diagram of a routing configuration method of view files in a first embodiment of the present application.

Referring to FIG. 1, a first embodiment of the routing configuration method of view files in the present application comprises:

step 101, determining a target single page application;

step 102, detecting whether there exists an update in a view file of the target single page application, if there exists the update in the view file of the target single page application, executing step 103; if there doesn't exist the update in the view file of the target single page application, continuing to detect;

step 103, determining an updated target view file;

step 104, acquiring update state information of the target view file;

step 105, updating routing configuration information in routing configuration file of the target single page application according to the update state information.

With respect to the aforesaid step 101, in this embodiment, the target single page application can be determined first. For example, in an initial stage of creation of a single page application project, the single page application to be created can be determined as a target single page application; or, an automatic routing configuration of view files can be performed on each of single page applications in the system periodically, and these single page applications are respectively determined as the target single page application. It should be explained that, in the aforesaid step 101, one, two or more than two target single page applications can be determined at the same time, and then the steps 102-105 are executed in parallel for each of the target single page applications respectively.

With respect to the aforesaid step 102, it can be understood that, when view files of the target single page application are changed, which means that, there are updates for the changed view files; at the moment, the step 103 can be executed to determine the changed view files. Otherwise, detection can be performed continuously. It should be noted that, in this embodiment, when it is detected that there is no update for the view file of the target single page application,
it is possible to either perform the detection continuously or perform other operations in a preset manner, it is not limited in this embodiment.

Particularly, with respect to the aforesaid step 102, whether there exists an update in the view file of the target single page application is determined by detecting whether a newly added view file or a deleted view file exists in the view file of the target single page application. It can be understood that, for routing configuration information in the routing configuration file, whether view files are the same is depend on the file name of the view file. Therefore, if the file name of the view file is not changed, it is considered that, there doesn't exist the update in the view file, otherwise, there exists the update in the view file. When there exists the update in the view file, two conditions may exist, that is, adding and/or deleting of the view file.

With respect to the aforesaid step 103, operation logs of the target single page application can be checked in order to screen out the changed view files, which view files are updated can be checked from the operation logs. It can be understood that, when an operator operates the view file in the target single page application, each of the various operation steps and operation states is recorded in a corresponding operation logs; therefore, which view files have been changed, in other words, which view files have been updated can be known by checking the operation logs. Therefore, these view files which are updated are determined as target view files.

With respect to the aforesaid step 104, it can be understood that, said obtaining the update state information of the target view file can comprise obtaining which updates exist in these target view files, and what is updated state information, etc. In particular, the updated state information of the target view files can be obtained from the operation logs. For example, an operator adds a view file A in the target single page application, the file name of the view file A is "AAA". Due to the fact that the various operations of the operator are recorded in the operation logs, thus, the updated state information of the view file A can be obtained through the operation logs, and includes: the update state is "newly added", the file name is "AAA".

With respect to the step 105, it can be understood that, at least one routing configuration file can be configured for each target single page application, and the routing configuration information about the view file of the target single page application is written in the routing configuration file. Therefore, when there is an update in the view file, the corresponding routing configuration information should be updated as well. After the update state information of the target view file is obtained, the routing configuration information in the routing configuration file can be updated according to a preset configuration rule.

Further, it can be known from what described above that, there may be two types of update states of the target view file, that is, adding and deleting; therefore, different routing configuration operations can be performed aiming at two different update states respectively.

Aiming at the deleted target view file, a processing process of the aforesaid step 105 can be: obtaining a first file name of the deleted view file from the update state information, searching the routing configuration information that corresponds to the first file name from the routing configuration file of the target single page application, and deleting the searched routing configuration information. It can be understood that, the routing configuration information includes the file name of the deleted view file before the routing configuration information is updated, thus, the routing configuration information that corresponds to the first file name can be searched and deleted. With respect to the single page application, after the routing configuration information of the view file is deleted, a loading of the deleted target view file would never be attempted again when the single page application is loaded, which means that, an updating of routing configuration of the deleted view file is completed.

Aiming at the newly added target view file, the processing process of the aforesaid step 105 can be: obtaining a second file name of the newly added view file from the update state information, and then writing a routing configuration information according to a designated location of the second file name in the routing configuration file of the target single page application, pursuant to a preset configuration rule. It can be understood that, the routing configuration information is written according to the preset configuration rule, and the routing configuration information that is written generally includes the file name of the view file, that is, the second file name herein. In addition, the routing configuration information that is written can also include a matching path of the view file, so that a jump between the view files can be facilitated. The matching path of the view file can be matched in the manner of indefinite matching, full matching or matching with parameters, etc. For example, in the URL (Uniform Resource Locator), a code fragment in the routing configuration information is /index/: id, wherein the "ID" herein is a variable; and the "*" in the code fragment /index * is a wildcard which represents a full match of a path starting from/index. In addition, the matched path with the parameters can be transmitted to a next view route object to complete a jump of another view.

It can be understood that, with respect to the aforesaid step 105, when there exist a plurality of target view files, that is, when many update state information are acquired, the step 105 can be executed repeatedly and by many times, and routing configuration files of the target single page applications are updated according to the various update state information respectively, and finally an automatic routing configuration of all view files is achieved. The multiple update state information can be processed in parallel when the aforesaid step 105 is executed. For example, when the update status information includes a newly added view file C1, a newly added view file C2, and a deleted view file C3, at this moment, a parallel processing of updating of routing configuration of view files C1, C2 and C3 can be respectively performed simultaneously, and finally the automatic routing configuration of all view files is achieved.

Furthermore, before the step 105, whether there exists a routing configuration file corresponding to the target single page application can be determined, if there doesn't exist the routing configuration file corresponding to the target single page application, a new routing configuration file for the target single page application is created. It can be understood that, when there doesn't exist the routing configuration file corresponding to the target single page application, the target single page application is generally an application program in an initial creating period or an application program that has just been created. At this time, a new routing configuration file, that is, a blank routing configuration file, can be created for the target single page application.

Furthermore, after the update state information of the target view files are acquired, the update state information can be recorded in a view file change list, the view file change list can record all historical update state information of view files of the target single page application. Therefore, the routing configuration information in the routing configuration files of the target single page application can be updated directly according to the view file change list. Routing configuration information is updated according to the view file change list, for the aforesaid newly created routing configuration files, routing configuration of the view files in batches is achieved, and higher configuration efficiency can be achieved.

In this embodiment, firstly, the target single page application is determined; secondly, whether there exists an update in the view file of the target single page application is detected; if there exists the update in the view file of the target single page application, the updated target single page application is determined; then, the update state information of the target view file is obtained; finally, the routing configuration information in the routing configuration file of the target single page application is updated according to the update state information. In this embodiment, by automatically detecting whether the view file of the single page application is updated, and updating the routing configuration information in the routing configuration file according to the update state information when there exists the update, an automatic configuration of the view file routing information is achieved, and an update efficiency of the routing configuration information is improved, a probability of routing configuration errors is reduced, and development and maintenance cost of single page applications is reduced.

The present application mainly describes a routing configuration method of view file above, a routing configuration apparatus of view file is described in detail below.

Figure 2:
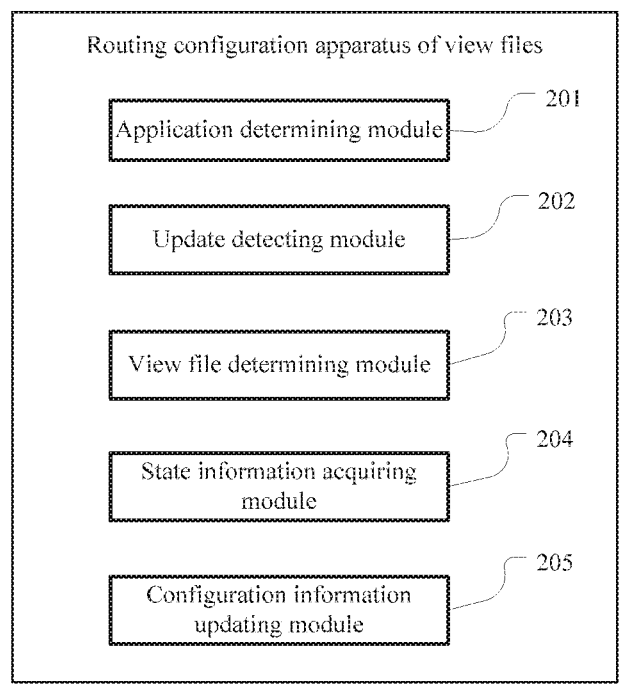
FIG. 2 illustrates a structural block diagram of a routing configuration apparatus of view files in a first embodiment of the present application.

FIG. 2 illustrates a structural block diagram of the routing configuration apparatus in a first embodiment of the present application.

In this embodiment, the routing configuration apparatus of view files comprises:

an application determining module 201 configured to determine a target single page application;

an update detecting module 202 configured to detect whether there exists an update in a view file of the target single page application;

a view file determining module 203 configured to determine an updated target view file if the update detecting module 202 detects that there exists the update for the view file of the target single page application;

a state information acquiring module 204 configured to acquire update state information of the target view file; and a configuration information updating module 205 configured to update routing configuration information in a routing configuration file of the target single page application according to the update state information.

Figure 3:
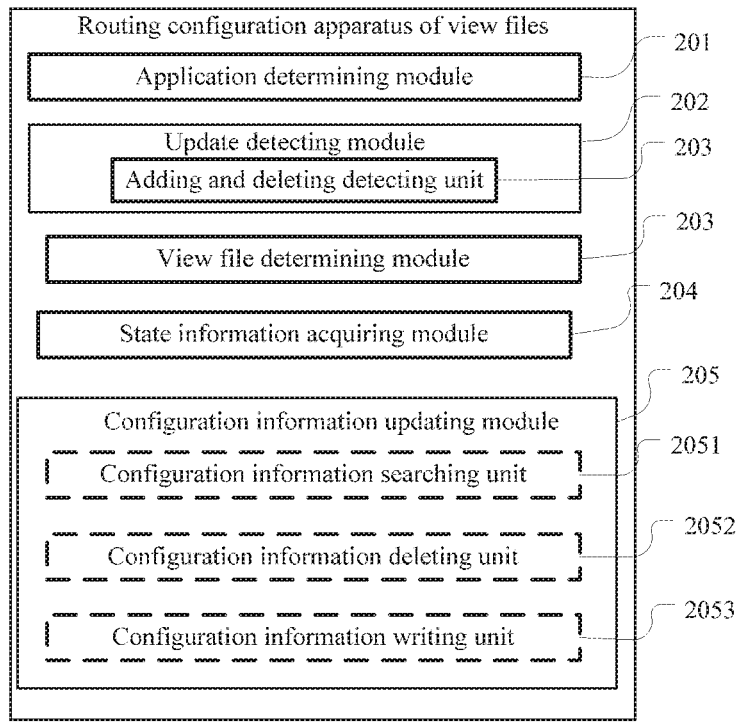
FIG. 3 illustrates a structural block diagram of the routing configuration apparatus of view files in a second embodiment of the present application.

FIG. 3 illustrates a structural block diagram of the routing configuration apparatus of view file in a second embodiment of the present application.

As shown in FIG. 3, the update detecting module 202 can further comprise:

an adding and deleting detecting unit 2021 configured to detect whether there is a newly added view file or deleted view file in the view file of the target single page application.

Furthermore, the update state information can comprise a first file name of the deleted view file;

the configuration information updating module 205 can particularly comprise:

a configuration information searching unit 2051 configured to search the routing configuration information corresponding to the first file name from a routing configuration file of the target single page application; and a configuration information deleting unit 2052 configured to delete the searched routing configuration information.

Furthermore, the update state information can comprise a second file name of the newly added view file;

the configuration information update module 205 can comprise:

a configuration information writing unit 2053 configured to write a routing configuration information according to a designated location of the second file name in the routing configuration file of the target single page application, pursuant to a preset configuration rule.

Figure 4:
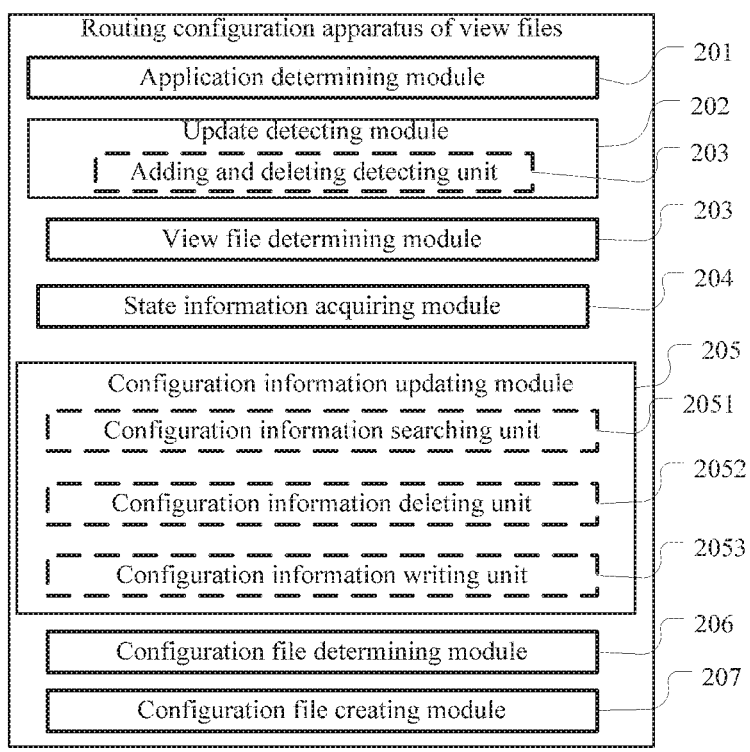
FIG. 4 illustrates a structural block diagram of the routing configuration apparatus of view files in a third embodiment of the present application.

FIG. 4 illustrates a structural block diagram of the routing configuration apparatus of view file in a third embodiment of the present application.

As shown in FIG. 4, the routing configuration apparatus can further comprise:

a configuration file determining module 206 configured to determine whether there exists a routing configuration file corresponding to the target single page application; and a configuration file creating module 207 configured to create a new routing configuration file for the target single page application if the configuration file determining module determines that there doesn't exist the routing configuration file corresponding to the target single page application.

It can be clearly understood by one of ordinary skill in the art that, for describing conveniently and concisely, regarding a specific working process of the system, devices and units, reference can be made to a corresponding process in the method embodiments described above, it is not repeatedly described herein.

The embodiments of the present application further provide a computer readable storage medium which stores a computer readable instruction, when the computer readable instruction is executed by a processor, steps in the routing configuration method of view file shown in FIG. 1 are implemented.

The embodiments of the present application further provide a terminal device which comprises a memory, a processor and a computer readable instruction stored in the memory and executable by the processor, when the computer readable instruction is executed by the processor, steps in the routing configuration method of view file shown in FIG. 1 are implemented.

What is claimed is:

1. A routing configuration method of view files, comprising:
   determining a target single page application;
   detecting whether there exists an update in a view file of the target single page application;
   determining an updated target view file if there is an update in the view file of the target single page application;
   acquiring update state information of the target view file; and
   updating routing configuration information in a routing configuration file of the target single page application according to the update state information.

2. The routing configuration method according to claim 1, wherein the step of detecting whether there exists an update in a view file of the target single page application comprises:
   detecting whether there is a newly added view file or a deleted view file in the view file of the target single page application.

3. The routing configuration method according to claim 2, wherein the update state information comprises a first file name of the deleted view file and wherein the step of updating routing configuration information in a routing configuration file of the target single page application according to the update state information comprises:
   searching the routing configuration information corresponding to the first file name from a routing configuration file of the target single page application; and
   deleting the searched routing configuration information.

4. The routing configuration method according to claim 2, wherein the update state information comprises a second file name of the newly added view file and wherein the step of updating routing configuration information in a routing configuration file of the target single page application according to the update state information comprises:
   writing a routing configuration information according to a designated location of the second file name in the routing configuration file of the target single page application, pursuant to a preset configuration rule.

5. The routing configuration method according to claim 1, wherein before the step of updating routing configuration information in a routing configuration file of the target single page application according to the update state information, the method comprises:
   determining whether there exists a routing configuration file corresponding to the target single page application; and
   creating a new routing configuration file for the target single page application if there doesn't exist the routing configuration file corresponding to the target single page application.

6. A computer readable storage medium which stores a computer readable instruction, wherein when executing the computer readable instruction, the processor implements following steps of:
   determining a target single page application;
   detecting whether there exists an update in a view file of the target single page application;
   determining an updated target view file if there is the update for the view file of the target single page application;
   acquiring update state information of the target view file; and
   updating routing configuration information in a routing configuration file of the target single page application according to the update state information.

7. The computer readable storage medium according to claim 6, wherein the step of detecting whether there exists an update in a view file of the target single page application comprises:
   detecting whether there is a newly added view file or deleted view file in the view file of the target single page application.

8. The computer readable storage medium according to claim 7, wherein the update state information comprises a second file name of the newly added view file and wherein the step of updating routing configuration information in a routing configuration file of the target single page application according to the update state information comprises:
   writing a routing configuration information according to a designated location of the second file name in the routing configuration file of the target single page application, pursuant to a preset configuration rule.

9. The computer readable storage medium according to claim 6, wherein the update state information comprises a first file name of the deleted view file and wherein the step of updating routing configuration information in a routing configuration file of the target single page application according to the update state information comprises:

searching the routing configuration information corresponding to the first file name from a routing configuration file of the target single page application; and deleting the searched routing configuration information.

10. The computer readable storage medium according to claim 6, wherein before the step of updating routing configuration information in a routing configuration file of the target single page application according to the update state information, the method comprises:

determining whether there exists a routing configuration file corresponding to the target single page application; and creating a new routing configuration file for the target single page application if there doesn't exist the routing configuration file corresponding to the target single page application.

11. A terminal device which comprises a memory, a processor and a computer readable instruction stored in the memory and executable by the processor, wherein when executing the computer readable instruction, the processor implements following steps of:

determining a target single page application;

detecting whether there exists an update in a view file of the target single page application;

determining an updated target view file if there is the update for the view file of the target single page application;

acquiring update state information of the target view file; and updating routing configuration information in a routing configuration file of the target single page application according to the update state information.

12. The terminal device according to claim 11, wherein the step of detecting whether there exists an update in a view file of the target single page application comprises:

detecting whether there is a newly added view file or deleted view file in the view file of the target single page application.

13. The terminal device according to claim 12, wherein the update state information comprises a first file name of the deleted view file and wherein the step of updating routing configuration information in a routing configuration file of the target single page application according to the update state information comprises:

searching the routing configuration information corresponding to the first file name from a routing configuration file of the target single page application; and deleting the searched routing configuration information.

14. The terminal device according to claim 12, wherein the update state information comprises a second file name of the newly added view file and wherein the step of updating routing configuration information in a routing configuration file of the target single page application according to the update state information comprises:

writing a routing configuration information according to a designated location of the second file name in the routing configuration file of the target single page application, pursuant to a preset configuration rule.

15. The terminal device according to claim 11, wherein before the step of updating routing configuration information in a routing configuration file of the target single page application according to the update state information, the method comprises:

determining whether there exists a routing configuration file corresponding to the target single page application; and creating a new routing configuration file for the target single page application if there doesn't exist the routing configuration file corresponding to the target single page application.

\* \* \* \* \*